(12) United States Patent
Liu et al.

(10) Patent No.: US 8,594,436 B2
(45) Date of Patent: Nov. 26, 2013

(54) METHOD AND CIRCUIT FOR DETECTING EDGE OF FIXED PATTERN

(75) Inventors: Yu-Shu Liu, Hsinchu (TW); Chun-Wei Chen, Taipei (TW); Jiande Jiang, Shaanxi Province (CN); Tsui-Chin Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 29 days.

(21) Appl. No.: 13/490,476

(22) Filed: Jun. 7, 2012

(65) Prior Publication Data

US 2013/0136365 A1 May 30, 2013

(30) Foreign Application Priority Data

Nov. 25, 2011 (TW) .............................. 100143360 A (51) Int. Cl.
*G06K 9/48* (2006.01)
(52) U.S. Cl.
USPC ........... 382/199; 382/170; 382/171; 382/172; 382/260; 382/261; 382/263; 382/264; 348/625; 348/142; 348/208.4
(58) Field of Classification Search
USPC ................. 382/199, 170–172, 260–266, 269; 348/625, 142, 208.4
See application file for complete search history.

(56) References Cited

U.S. PATENT DOCUMENTS

| | | | | |
|---|---|---|---|---|
| 5,572,603 A * | 11/1996 | Koike | ............................. | 382/199 |
| 5,832,115 A * | 11/1998 | Rosenberg | ..................... | 382/199 |
| 5,943,441 A * | 8/1999 | Michael | ......................... | 382/199 |
| 6,031,935 A * | 2/2000 | Kimmel | .......................... | 382/173 |
| 6,101,274 A * | 8/2000 | Pizano et al. | ................... | 382/176 |
| 6,246,783 B1 * | 6/2001 | Avinash | ........................ | 382/128 |
| 6,330,037 B1 * | 12/2001 | Nakajima et al. | .............. | 348/607 |
| 6,370,278 B1 * | 4/2002 | Waguri | ........................... | 382/266 |
| 6,415,053 B1 * | 7/2002 | Norimatsu | ..................... | 382/199 |
| 6,571,006 B1 * | 5/2003 | Montillo et al. | ............... | 382/147 |
| 6,584,221 B1 * | 6/2003 | Moghaddam et al. | ......... | 382/165 |
| 6,614,930 B1 * | 9/2003 | Agnihotri et al. | .............. | 382/176 |
| 6,710,822 B1 * | 3/2004 | Walker et al. | .................. | 348/722 |
| 6,778,698 B1 * | 8/2004 | Prakash et al. | ................. | 382/164 |
| 7,268,822 B2 * | 9/2007 | Kang et al. | ...................... | 348/448 |
| 7,936,941 B2 * | 5/2011 | Sumiya et al. | ................. | 382/266 |
| 8,295,607 B1 * | 10/2012 | Biswas et al. | .................. | 382/199 |
| 8,401,306 B2 * | 3/2013 | Dai | ................................ | 382/199 |
| 8,446,524 B2 * | 5/2013 | Chen et al. | ..................... | 348/441 |
| 2002/0122602 A1 * | 9/2002 | Rouvellou | .................... | 382/261 |
| 2002/0130892 A1 * | 9/2002 | Holtslag | ........................ | 345/690 |
| 2003/0081854 A1 * | 5/2003 | Deshpande | .................... | 382/261 |
| 2005/0013474 A1 * | 1/2005 | Sim | ................................ | 382/145 |

(Continued)

*Primary Examiner* — Jayesh A Patel
(74) *Attorney, Agent, or Firm* — Jianq Chyun IP Office (57) ABSTRACT

Method for detecting edge of fixed pattern includes receiving and analyzing a first image to obtain a first edge information. Second image and a corresponding second edge information are received, in which the second image includes an accumulation of image history information. According to the first edge information and the second edge information, a consistent number and an inconsistent number for pairs of pixels at the corresponding location of the first image and the second image are calculated, in which the consistent number represents how many pairs of pixels of which two compared pixels of each pair are both edge pixels, and the inconsistent number represents one of the two compared pixels is not the edge pixel. When the consistent number is greater than first predetermined value and meanwhile the inconsistent number is less than second predetermined value, first image and second image have a fixed pattern with fixed edge.

15 Claims, 4 Drawing Sheets

(56) References Cited

U.S. PATENT DOCUMENTS

2005/0249430 A1* 11/2005 Lim .............................. 382/266
2006/0181740 A1* 8/2006 Kim et al. .................... 358/3.26
2007/0165953 A1* 7/2007 Kim et al. ..................... 382/199
2008/0159404 A1* 7/2008 Hong et al. ............... 375/240.23
2010/0014771 A1* 1/2010 Kim et al. ..................... 382/263
2010/0260417 A1* 10/2010 Dai ............................... 382/165

* cited by examiner

FIG. 9 form dynamic images. Generally, the dynamic image display is for example playing back the images on a video camera or a TV set.

METHOD AND CIRCUIT FOR DETECTING EDGE OF FIXED PATTERN

CROSS-REFERENCE TO RELATED APPLICATION

This application claims the priority benefit of Taiwan application serial no. 100143360, filed on Nov. 25, 2011. The entirety of the above-mentioned patent application is hereby incorporated by reference herein and made a part of this specification.

BACKGROUND OF THE INVENTION

1. Field of the Invention

The present invention generally relates to detecting a fixed pattern, in particularly, relates to detecting an edge of the fixed pattern.

2. Description of Related Art

Dynamic image display indicates displaying multiple images at a desired frequency. The display content of the images changes over time to form dynamic images. Generally, the dynamic image display is for example playing back the images on a video camera or a TV set.

However, when the original dynamic image content is played back, a fixed-still pattern may be overlapped on the dynamic image content based on some requirements. The fixed-still pattern is for example a logo pattern, a channel letter or sign, or some other patterns. The fixed-still pattern usually remains in the still state for a while.

Figure 1:
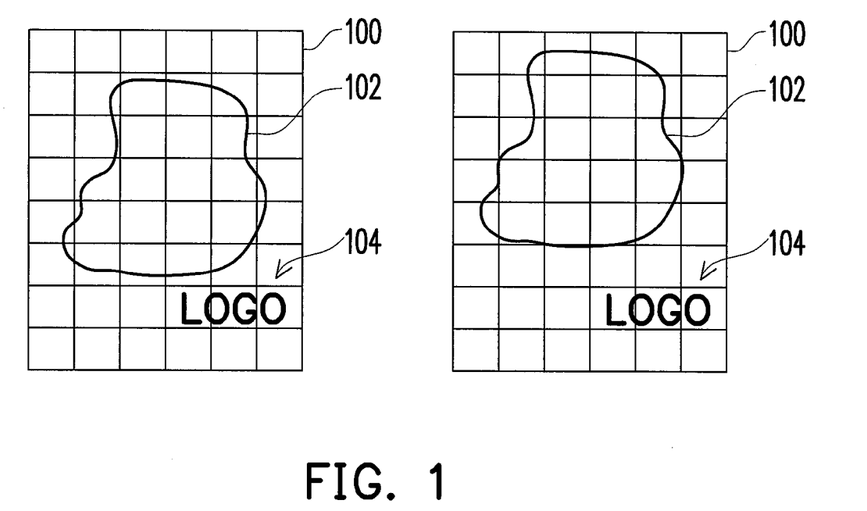
FIG. 1 is a schematic view of changing of a dynamic image content when played back in the prior art.

FIG. 1 is a schematic view of changing of a dynamic image content when played back. Referring to FIG. 1, an image content displayed at a time point is illustrated in the upper figure. The content of the image 100 for example includes an object 102 and a fixed-still pattern 104. The fixed-still pattern 104 is e.g. a logo that represents the image content and is located at a fixed position in the still state. In the lower figure of FIG. 1, the next display image is illustrated. Here, the object 102 moves to another position, but the fixed-still pattern 104 remains at the same position.

In one circumstance of the sudden disappearance of the fixed-still pattern 104, the fixed-still pattern 104 is set to be not displayed any more. However, in another circumstance, the fixed-still pattern 104 disappears suddenly for example due to noises or instability of the display content or the like. The sudden disappearance of the fixed-still pattern 104 may result in judder of the fixed-still pattern 104.

Figure 2:
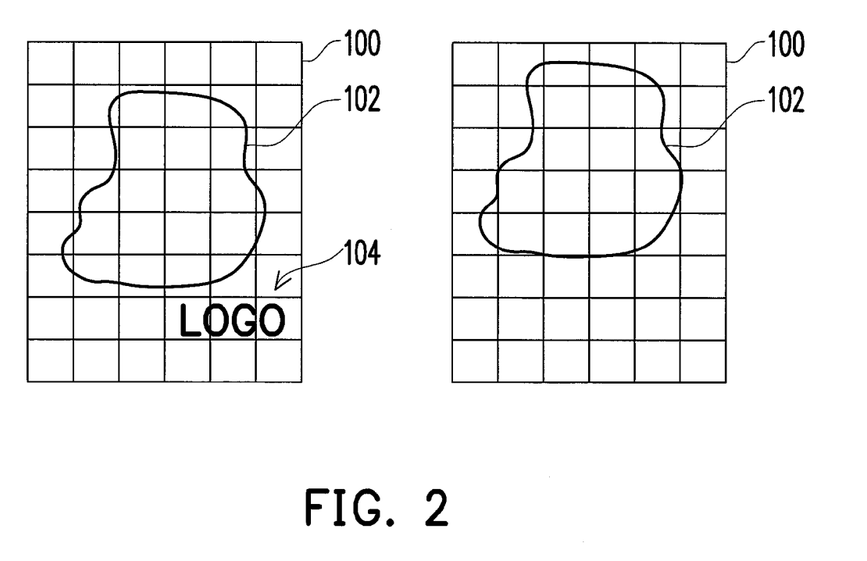
FIG. 2 is a schematic view of changing of a dynamic image content when played back in the prior art.

FIG. 2 is a schematic view of changing of a dynamic image content when played back. The upper figure of FIG. 2 is identical to that of FIG. 1. When the next image is displayed as shown in the lower figure of FIG. 2, the fixed-still pattern 104 disappears suddenly.

In another similar circumstance, the fixed-still pattern 104 may move to cause the judder surrounding the fixed-still pattern 104, which may result in the blocky of the fixed-still pattern 104.

However, it is hard to distinguish the disappearance of the fixed-still pattern 104 and at least the situation that a fixed structure moves periodically.

Therefore, it is a problem in need of a solution how to effectively detect an edge of a fixed-still pattern to detect whether the displayed fixed-still pattern is contained.

SUMMARY OF THE INVENTION

The present invention is directed to a method and circuit for detecting an edge of a fixed pattern, which determines whether the fixed pattern exists by detecting an edge of the fixed pattern, in which the image history accumulation is taken into consideration at the same time.

The present invention is directed to a method for detecting an edge of a fixed pattern. The method includes receiving a current input image. A history image and a corresponding history edge information are received. According to a weight ratio, the current input image and the history image are added to obtain a current analyzing image. An edge strength value of each pixel of the current analyzing image is calculated, in which the edge strength value is calculated based on a predetermined condition of edge characteristic. When the edge strength value is greater than a predetermined value, the pixel is a possible edge pixel. The current analyzing image is taken as the history image for next edge detection and analysis, and the edge pixel and the edge strength are recorded in the history edge information. For the edge pixel of the current analyzing image and the edge pixel of the history image, a consistent pixel number that meets a predetermined consistent condition and an inconsistent pixel number that meets a predetermined inconsistent condition are calculated. When the consistent pixel number is greater than a first predetermined value, and meanwhile the inconsistent pixel number is less than a second predetermined value, the current input image is detected to have a fixed pattern with a fixed edge.

The present invention is directed to a method for detecting an edge of a fixed pattern. The method includes receiving and analyzing a first image to obtain a first edge information. A second image and a corresponding second edge information are received, in which the second image includes an accumulation of image history information. According to the first edge information and the second edge information, a consistent number and an inconsistent number for pairs of pixels at the corresponding location of the first image and the second image are calculated, in which the consistent number represents how many pairs of pixels of which two compared pixels of each pair are both edge pixels, and the inconsistent number represents one of the two compared pixels is not the edge pixel. When the consistent number is greater than a first predetermined value and meanwhile the inconsistent number is less than a second predetermined value, the first image and the second image have a fixed pattern with a fixed edge.

The present invention is directed to a circuit for detecting an edge of a fixed pattern, which includes the following units. An image overlapping unit receives and stores a current input image and a history image and a corresponding history edge information. The current input image and the history image are added to obtain a current analyzing image according to a weight ratio. An edge detecting unit calculates an edge strength value of each pixel of the current analyzing image. The edge strength value is calculated based on a predetermined condition of edge characteristic. When the edge strength value is greater than a predetermined value, the pixel is a possible edge pixel. The current analyzing image is taken as the history image for next edge detection and analysis, and the edge pixel and the edge strength are recorded in the history edge information. A fixed pattern detecting unit calculates a consistent pixel number that meets a predetermined consistent condition and an inconsistent pixel number that meets a predetermined inconsistent condition for the edge pixel of the current analyzing image and the edge pixel of the history image. When the consistent pixel number is greater than a first predetermined value and meanwhile the inconsistent pixel number is less than a second predetermined value, the current input image is detected to have a fixed pattern with a fixed edge.

In order to make the aforementioned features and advantages of the present invention comprehensible, embodiments are described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

To effectively fast detect the disappearance of the fixed-still pattern, the present invention provides several embodiments for illustration, but the present invention is not limited to the illustrated embodiments.

For a string of the dynamic displayed images, the image frames are displayed in a time sequence of the display frequency. For the dynamic images, the shape or position of the image content usually changes over time, but the fixed-still pattern keeps still for a long period of time. For the actual displayed images, the fixed-still pattern is floated on the background dynamic image.

Generally, the fixed-still pattern has a distinct object edge, and the object edge keeps in the still state over time. Therefore, the present invention proposes detecting the edge to detect whether the fixed-still pattern exists based on the characteristic of the fixed-still pattern.

Figure 3:
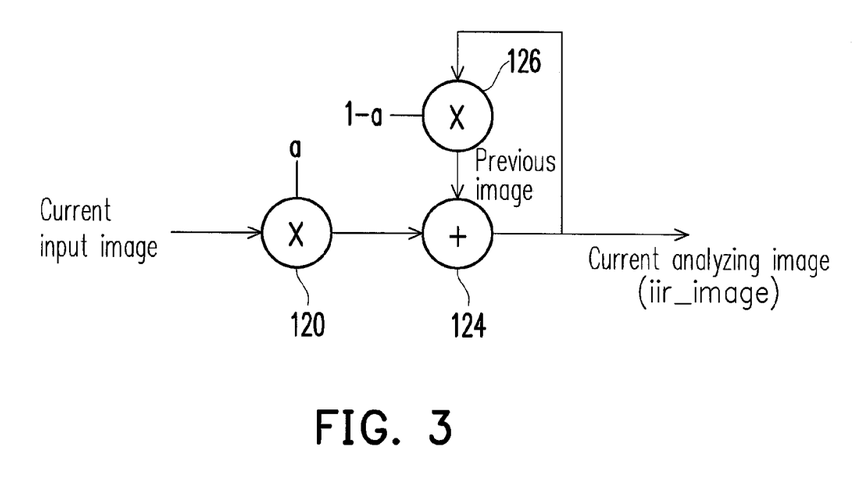
FIG. 3 is a schematic circuit diagram of an image accumulation unit according to an embodiment of the present invention.

Since the fixed-still pattern does not move or change over time, if the images are accumulated for a long time, the fixed-still pattern is more distinct and strengthened as compared with other images. FIG. 3 is a schematic circuit diagram of an image accumulation unit according to an embodiment of the present invention. Referring to FIG. 3, for a current input image, a multiplier 120 is used to multiply a pixel value of the current image by an adjustable parameter value. The parameter value a is a weight value e.g. the value greater than 0.5 and less than 1, and further is for example 0.7. Then, an adder 124 is used to add the pixel value output by the multiplier 120 and the pixel value obtained by multiplying the previous image by a weight value of 1−a by the multiplier 126, and output the current analyzing image indicated by iir_image. The current analyzing image in the next analysis is taken as the previous image, and is multiplied by the weight value of 1−a by the multiplier 126 and then added with the pixel value obtained by multiplying the pixel value of the current image by a, thus forming the next current analyzing image.

In other words, the current analyzing image includes some image history information. After a long time of accumulation, if the fixed-still pattern exists, the pattern is more distinct and the boundary is easy to be detected.

Figure 4:
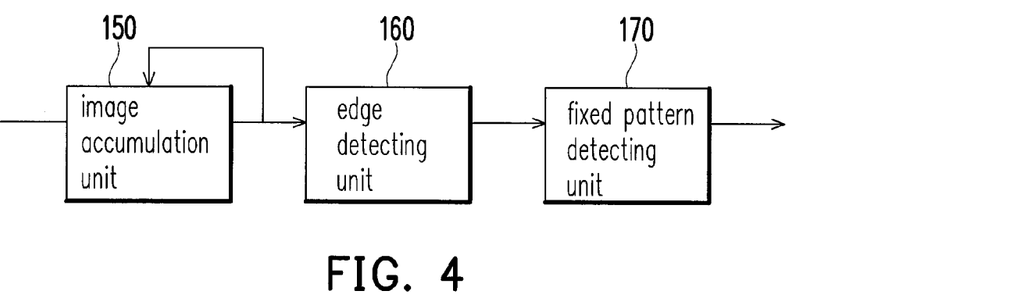
FIG. 4 is a schematic view of a circuit for detecting an edge of a fixed pattern.

Then, the mechanism for detecting the edge of the fixed pattern is described. FIG. 4 is a schematic view of a circuit for detecting an edge of a fixed pattern. Referring to FIG. 4, the circuit for detecting an edge of a fixed pattern 11 includes an image accumulation unit 150, an edge detecting unit 160 and a fixed pattern detecting unit 170. The three units respectively execute the corresponding functions which are described as follows.

The image accumulation unit 150 includes a circuit operation as shown in FIG. 3, and may generate the current analyzing image and store the required information such as the follow-up current analyzing edge information or the history edge information of the previous history image.

The edge detecting unit 160 is used to calculate an edge strength value of each pixel of the current analyzing image. The edge strength value is calculated based on a predetermined condition of edge characteristic, which is described as follows. When the edge strength value is greater than a predetermined value, the pixel is the possible edge pixel.

The current analyzing image may be taken as the history image of the next edge detection and analysis, and the edge pixel and the edge strength are both recorded in the history edge information, for example, stored in the image accumulation unit 150.

After identifying whether the pixel of the current analyzing image is the edge pixel and calculating the corresponding edge strength, the fixed pattern detecting unit 170 calculates a consistent pixel number that meets a predetermined consistent condition and an inconsistent pixel number that meets a predetermined inconsistent condition for the edge pixel of the current analyzing image and the edge pixel of the history image.

When the consistent pixel number is greater than a first predetermined value and meanwhile the inconsistent pixel number is less than a second predetermined value, the current input image is detected to have a fixed pattern with a fixed edge.

The mechanism for detecting the edge pixel is described as follows. The mechanism for determining whether a pixel is the object edge is not particularly limited. Hereinafter, the edge pixel is fast detected and is given an edge strength value for further determination.

Figure 5:
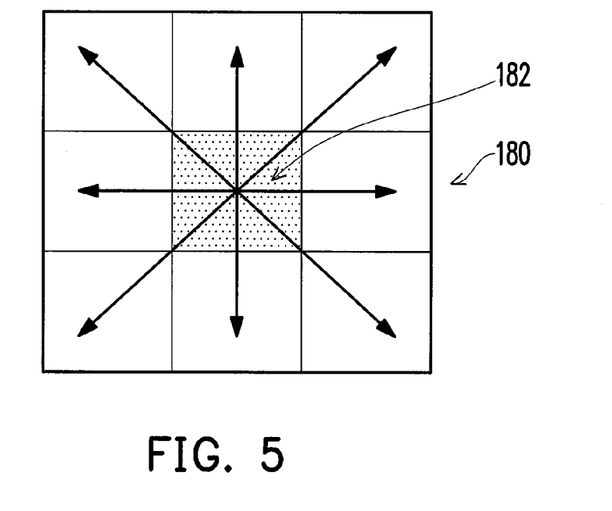
FIG. 5 is a schematic view of an edge detecting mechanism according to an embodiment of the present invention.

FIG. 5 is a schematic view of an edge detecting mechanism according to an embodiment of the present invention. Referring to FIG. 5, for example, a 3×3 pixel area 180 is regarded as the filter, the pixel in the area is the analyzing pixel 182 for analysis and identification. The four pairs of pixels respectively adjacent to the analyzing pixel 182 and extending in a horizontal direction, a vertical direction, a first oblique direction and a second oblique direction by taking the analyzing pixel 182 as a center are analyzed. An absolute difference of the pixel values of each pair of pixels are calculated, so the four pixel value differences of the four pairs of pixels are respectively calculated. Here, the pixel value refers to the characteristic parameter that represents a pixel color, for example is a color grey level which may be a RGB grey level value or a R, G, or B grey level value respectively.

When at least one of the four pixel absolute difference values is greater than a threshold, the analyzing pixel 182 may be the edge pixel attribute, and the largest one of the four pixel absolute difference values is the edge strength value of the edge pixel.

The method for identifying whether the pixel is the edge pixel is not particularly limited to the above, but the method illustrated above is simple and facilitates the fast detection.

After all the pixels of the current analyzing image are analyzed, the pixels the edge may be stored in the edge information and the corresponding edge strength value may also be stored in the edge information. In the cyclic detecting process, the current edge information and the history edge information corresponding to the current analyzing image and the previous history image are compared to detect the still state edge of the fixed pattern.

The mechanism for detecting an edge of a fixed pattern is described. Since the edge of the fixed pattern is located at the fixed position in the still state, if in the situation that the fixed pattern is displayed, a certain number of the edge pixels of the current analyzing image and the previous history image are consistent. However, if the determination is made merely based on the number of the consistent edge pixels of the two images being greater than a large threshold, the error still exists. Therefore, the present invention further proposes the number of the inconsistent pixels for checking remains less than a small threshold. Here, the inconsistent pixel refers to one of the two compared pixels is the edge pixel and the one pixel is not the edge pixel, and thus the fixed pattern can be accurately detected in the situation of meeting two conditions at the same time.

The pixels of one block (blk-size) is taken as an example for calculating the consistent number (Con) and the inconsistent number (InCon), and the statistic conditions may be expressed by mathematical formulas, such as formula (1) and formula (2):

$$Con = \sum_{i=1,j=1}^{blk\text{-}size} (is\_edge_{i,j,input} \ \& \ is\_edge_{i,j,iir} \ \& |trans_{i,j,input} - trans_{i,j,iir}| < th_d); \quad (1)$$

$$InCon = \sum_{i=1,j=1}^{blk\text{-}size} ((\overline{is\_edge_{i,j,input}} \ \& \ is\_edge_{i,j,iir}) \ // \ (is\_edge_{i,j,input} \ \& \ \overline{is\_edge_{i,j,iir}})), \quad (2)$$

where in formula (1), the parameter $is\_edge_{i,j,input}$ refers to that the pixel of the current analyzing image (input) at the address of (i,j) is the edge pixel, and the parameter $trans_{i,j,input}$ refers to the edge strength of the edge transition. The parameter $is\_edge_{i,j,input}$ refers to that the pixel of the previous image (iir) at the address of (i,j) is the edge pixel, and the parameter $trans_{i,j,iir}$ refers to the edge strength of the edge transition. The symbol & represents the logic relation of AND. In other words, the current analyzing image and the previous image have the consistent number of pixels which are the edge. In addition, for example, the edge strength is required to be consistent and less than a difference threshold $Th_d$. The calculated consistent number of pixels meeting the conditions is indicated by Con.

Furthermore, in formula (2), the parameter $\overline{is\_edge_{i,j,input}}$ and $\overline{is\_edge_{i,j,iir}}$ refer to the negative logic state and the symbol "//" represents the logic relation of OR. The formula (2) is used to generate the inconsistent number of the inconsistent pixels indicated by InCon when one of the two compared pixels is the edge pixel and the other is not the edge pixel.

Hereinafter, several situations of for example a 4×4 display area are illustrated. Under the condition that the large threshold Th1 of the consistent number is for example 8, the small threshold Th2 of the inconsistent number is for example 2, and Con>Th1 and InCon<Th2, it is determined that the displayed image includes the fixed pattern with the fixed-still edge.

Figure 6:
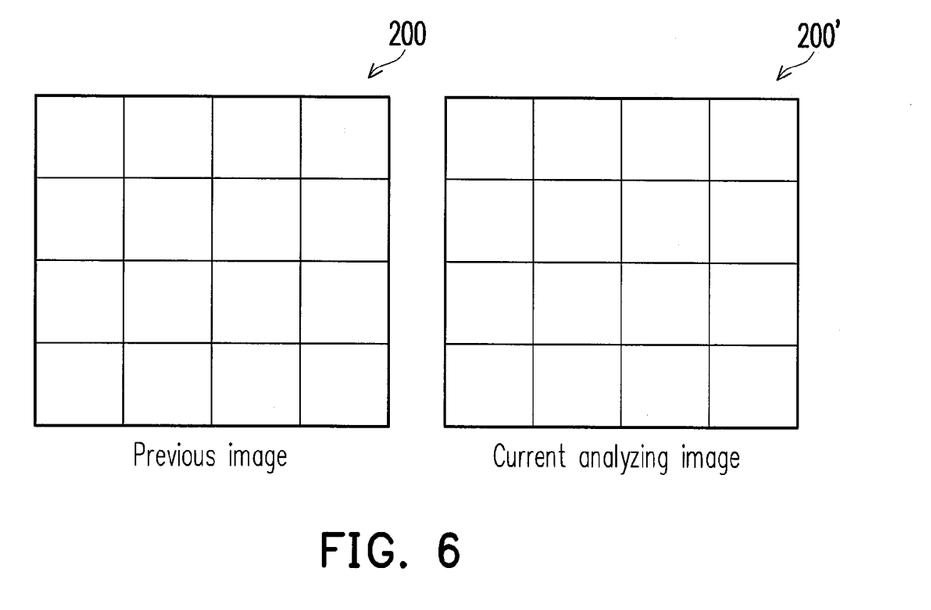
FIG. 6 is a schematic view of detection when an edge of a fixed pattern does not exist according to an embodiment of the present invention.

FIG. 6 is a schematic view of detection when an edge of a fixed pattern does not exist according to an embodiment of the present invention. Referring to FIG. 6, if the fixed pattern does not exit in the display, none of the pixels of the previous image 200 and the current analyzing image 200' are detected to be the edge pixel. Therefore, the consistent number Con is zero, and the inconsistent number InCon is also zero. Accordingly, Con=0 and InCon=0, which does not meet the condition of Con>8 and InCon<2.

Figure 7:
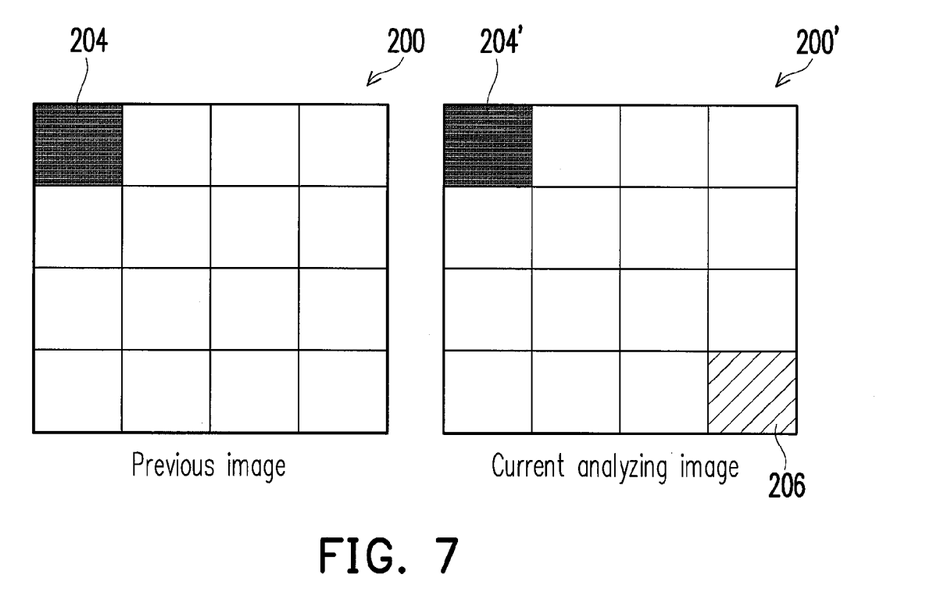
FIG. 7 is a schematic view of detection when the edge pixel exits but the fixed pattern does not exist according to an embodiment of the present invention.

FIG. 7 is a schematic view of detection when the edge pixel exits but the fixed pattern does not exist according to an embodiment of the present invention. Referring to FIG. 7, it is assumed that both the previous image 200 and the current analyzing image 200' have the edge pixel areas 204 and 204' with the object edge on the upper left corner. Therefore, some pixels in the surrounding area may be detected to be the edge pixel, and the number is for example 4, and thus the consistent number Con=4. In addition, the current analyzing image has the extra edge pixel area 206 for example on the lower right corner of the image 202, and the generated inconsistent number InCon=4. Accordingly, Con=4 and InCon=4, which does not meet the condition of Con>8 and InCon<2.

Figure 8:
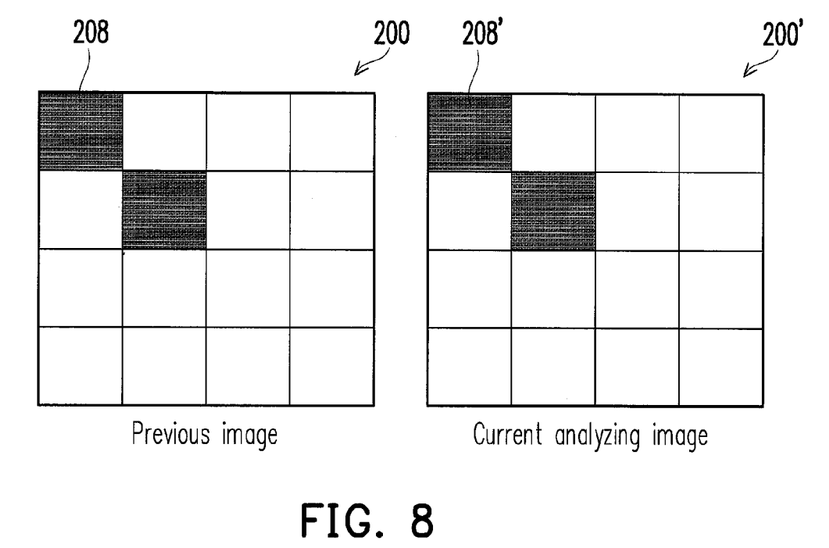
FIG. 8 is a schematic view of detection when the edge pixel of the fixed pattern exists according to an embodiment of the present invention.

FIG. 8 is a schematic view of detection when the edge pixel of the fixed pattern exists according to an embodiment of the present invention. Referring to FIG. 8, it is assumed that both the previous image 200 and the current analyzing image 200' have the edge pixel areas 208 and 208' with the object edge on the upper left corner. Therefore, some pixels in the surrounding area may be detected to be the edge pixel, and the number is for example 9, and thus the consistent number Con=9. In addition, none of the current analyzing image and the previous image have other edge pixels, which results in the inconsistent number InCon=0. Accordingly, Con=9 and InCon=0, which meets the condition of Con>8 and InCon<2.

Figure 9:
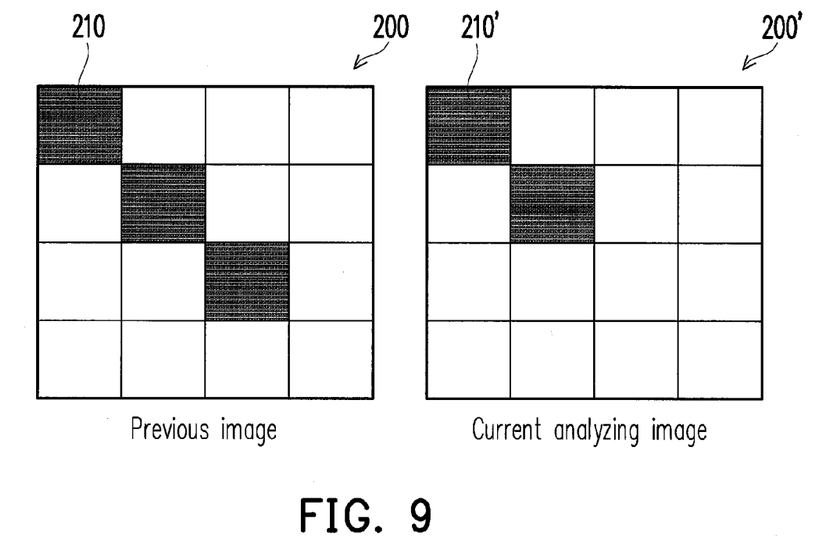
FIG. 9 is a schematic view of detection when a similar edge pixel of the fixed pattern exists according to an embodiment of the present invention.

FIG. 9 is a schematic view of detection when a similar edge pixel of the fixed pattern exists according to an embodiment of the present invention. Referring to FIG. 9, it is assumed that both the previous image 200 and the current analyzing image 200' have the edge pixel areas 210 and 210' with the object edge pixel on the upper left corner. Therefore, some pixels in the surrounding area may be detected to be the edge pixel, and the number is for example 9, and thus the consistent number Con=9. In addition, the current analyzing image and the previous image have the edge pixel difference, which results in the inconsistent number InCon=5. Accordingly, Con=9 and InCon=5, which does not meet the condition of Con>8 and InCon<2.

Since the condition of Con>Th1 and InCon<Th2 may be used to accurately detect the situation of FIG. 8. The values of the large threshold Th1 and the small threshold Th2 may be set according to the actual fixed pattern under detecting, and are not required to be the universal fixed value. By detecting the edge of the fixed pattern in the still state under the two conditions at the same time, the detection is more accurate.

In view of the above characteristics, the present invention provides a method for detecting an edge of a fixed pattern. The method includes receiving and analyzing a first image to obtain a first edge information. A second image and a corresponding second edge information are received, in which the second image includes an accumulation of image history information. According to the first edge information and the second edge information, a consistent number and an inconsistent number for pairs of pixels at the corresponding location of the first image and the second image are calculated. The consistent number represents how many pairs of pixels of which two compared pixels of each pair are both edge pixels, and the inconsistent number represents one of the two compared pixels is not the edge pixel. When the consistent number is greater than a first predetermined value and meanwhile the inconsistent number is less than a second predetermined value, the first image and the second image have a fixed pattern with a fixed edge.

The present invention provides a circuit for detecting an edge of a fixed pattern, which includes the following units. An image overlapping unit receives and stores a current input image and a history image and a corresponding history edge information. The current input image and the history image are added to obtain a current analyzing image according to a weight ratio. An edge detecting unit calculates an edge strength value of each pixel of the current analyzing image. The edge strength value is calculated based on a predetermined condition of edge characteristic. When the edge strength value is greater than a predetermined value, the pixel is a possible edge pixel. The current analyzing image is taken as the history image for next edge detection and analysis, and the edge pixel and the edge strength are recorded in the history edge information. A fixed pattern detecting unit calculates a consistent pixel number that meets a predetermined consistent condition and an inconsistent pixel number that meets a predetermined inconsistent condition for the edge pixel of the current analyzing image and the edge pixel of the history image. When the consistent pixel number is greater than a first predetermined value and meanwhile the inconsistent pixel number is less than a second predetermined value, the current input image is detected to have a fixed pattern with a fixed edge.

In addition, since the previous image may reserve part of the history edge information, if the fixed pattern is actually displayed, since the fixed pattern is located at the fixed position in the still state, after the accumulation over time, if the fixed pattern display exists, the edge is strengthened to facilitate detecting.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting an edge of a fixed pattern, comprising:
    receiving a current input image;
    receiving a history image and a corresponding history edge information;
    adding the current input image and the history image according to a weight ratio to obtain a current analyzing image;
    calculating an edge strength value of each pixel of the current analyzing image, wherein the edge strength value is calculated based on a predetermined condition of edge characteristic, and when the edge strength value is greater than a predetermined value, the pixel is a possible edge pixel, the current analyzing image is taken as the history image for next edge detection and analysis, and the edge pixel and the edge strength are recorded in the history edge information;
    calculating a consistent pixel number that meets a predetermined consistent condition and an inconsistent pixel number that meets a predetermined inconsistent condition for the edge pixel of the current analyzing image and the edge pixel of the history image; and
    when the consistent pixel number is greater than a first predetermined value and meanwhile the inconsistent pixel number is less than a second predetermined value, detecting the current input image having a fixed pattern with a fixed edge.

2. The method for detecting an edge of a fixed pattern according to claim 1, wherein the edge characteristic condition comprises:
    calculating four pixel value differences of the four pairs of pixels respectively adjacent to an analyzing pixel and extending in a horizontal direction, a vertical direction, a first oblique direction and a second oblique direction by taking the analyzing pixel as a center,
    wherein when at least one of four pixel absolute difference values is greater than a threshold, the analyzing pixel is one of the edge pixels, and the largest one of the four pixel absolute difference values is the edge strength value of the edge pixel.

3. The method for detecting an edge of a fixed pattern according to claim 1, wherein the consistent condition comprises:
    for two compared pixels at the corresponding location of the current analyzing image and the history image, if the two compared pixels are both the edge pixels, and respectively an absolute difference of the edge strength value is less than a predetermined value, the two compared pixels are consistent, and the consistent number is added with one, wherein the absolute difference of the edge strength value comprises considering whether the two compared pixels are in the same direction of the edge and whether a slope of the edge strength value has the similar condition.

4. The method for detecting an edge of a fixed pattern according to claim 3, wherein the inconsistent condition comprises:
    if one of the two compared pixels is the edge and the other is not the edge, the two compared pixels are inconsistent and the inconsistent number is added with one.

5. The method for detecting an edge of a fixed pattern according to claim 1, wherein the weight ratio corresponding to the current analyzing image and the history image is a:(1−a), where a is an adjustable value in a range of 0 to 1.

6. The method for detecting an edge of a fixed pattern according to claim 1, wherein the edge detecting for the current analyzing image is carried out with a whole piece of the image or a block as a detecting unit.

7. A method for detecting an edge of a fixed pattern, comprising:
    receiving and analyzing a first image to obtain a first edge information;
    receiving a second image and a corresponding second edge information, in which the second image comprises an accumulation of image history information;

according to the first edge information and the second edge information, calculating a consistent number and an inconsistent number for pairs of pixels at the corresponding location of the first image and the second image, wherein the consistent number represents how many pairs of pixels of which two compared pixels of each pair are both edge pixels, and the inconsistent number represents one of the two compared pixels is not the edge pixel; and when the consistent number is greater than a first predetermined value and meanwhile the inconsistent number is less than a second predetermined value, the first image and the second image have a fixed pattern with a fixed edge.

8. The method for detecting an edge of a fixed pattern according to claim 7, wherein the condition for determining whether a pixel is the edge pixel comprises:

calculating four pixel value absolute differences of the four pairs of pixels respectively adjacent to an analyzing pixel and extending in a horizontal direction, a vertical direction, a first oblique direction and a second oblique direction by taking the analyzing pixel as a center, wherein when at least one of the four pixel absolute differences is greater than a threshold, the analyzing pixel has an edge pixel attribute.

9. The method for detecting an edge of a fixed pattern according to claim 7, wherein when the two compared pixels are both the edge pixels, the statistic of the consistent number further meets the following conditions:

the two compared pixels respectively have two edge strength values and the two edge strength values have an absolute difference that is less than a predetermined value.

10. The method for detecting an edge of a fixed pattern according to claim 7, wherein the edge detecting for the current analyzing image is carried out with a whole piece of the image or a block as a detecting unit.

11. A circuit for detecting an edge of a fixed pattern, comprising:

an image overlapping unit, for receiving and storing a current input image and a history image and a corresponding history edge information, wherein the current input image and the history image are added according to a weight ratio to obtain a current analyzing image;

an edge detecting unit, for calculating an edge strength value of each pixel for the current analyzing image, wherein the edge strength value is calculated based on a predetermined condition of edge characteristic, and when the edge strength value is greater than a predetermined value, the pixel is a possible edge pixel, wherein the current analyzing image is taken as the history image for next edge detection and analysis, and the edge pixel and the edge strength are recorded in the history edge information; and a fixed pattern detecting unit, for calculating a consistent pixel number that meets a predetermined consistent condition and an inconsistent pixel number that meets a predetermined inconsistent condition for the edge pixel of the current analyzing image and the edge pixel of the history image, wherein when the consistent pixel number is greater than a first predetermined value and meanwhile the inconsistent pixel number is less than a second predetermined value, the current input image is detected to have a fixed pattern with a fixed edge.

12. The circuit for detecting an edge of a fixed pattern according to claim 11, wherein the edge characteristic condition comprises:

calculating four pixel value absolute differences of the four pairs of pixels respectively adjacent to an analyzing pixel and extending in a horizontal direction, a vertical direction, a first oblique direction and a second oblique direction by taking the analyzing pixel as a center, wherein when at least one of the four pixel absolute differences is greater than a threshold, the analyzing pixel is one of the edge pixels, and the largest one of the four pixel absolute difference values is the edge strength value of the edge pixel.

13. The circuit for detecting an edge of a fixed pattern according to claim 11, wherein the consistent condition comprises:

for two compared pixels at the corresponding location of the current analyzing image and the history image, if the two compared pixels are both the edge pixels, and respectively an absolute difference of the edge strength value is less than a predetermined value, the two compared pixels are consistent, and the consistent number is added with one.

14. The circuit for detecting an edge of a fixed pattern according to claim 13, wherein the inconsistent condition comprises:

if one of the two compared pixels is the edge and the other is not the edge, the two compared pixels are inconsistent and the inconsistent number is added with one.

15. The circuit for detecting an edge of a fixed pattern according to claim 11, wherein the weight ratio corresponding to the current analyzing image and the history image is a:(1−a), where a is an adjustable value in a range of greater than 0.5 and less than 1.

* * * * *